(12) United States Patent
K T

(10) Patent No.: US 10,784,585 B2
(45) Date of Patent: Sep. 22, 2020

(54) HARNESSING SHARP SHAPES IN ANTENNA STRUCTURE TO ENHANCE LINK COUPLING EFFICIENCY

(71) Applicant: HCL TECHNOLOGIES LIMITED, Uttar Pradesh (IN)

(72) Inventor: Gandhi Karuna K T, Tamil Nadu (IN)

(73) Assignee: HCL TECHNOLOGIES LIMITED (IN)

( * ) Notice: Subject to any disclaimer, the term of this patent is extended or adjusted under 35 U.S.C. 154(b) by 53 days.

(21) Appl. No.: 16/196,860

(22) Filed: Nov. 20, 2018

(65) Prior Publication Data

US 2019/0157767 A1 May 23, 2019

(30) Foreign Application Priority Data

Nov. 20, 2017 (IN) .............................. 201711041541

(51) Int. Cl.
*H01Q 17/00* (2006.01)
*H01Q 7/00* (2006.01)
*H01Q 11/14* (2006.01)
*H01Q 9/04* (2006.01)
*H04B 5/00* (2006.01)

(52) U.S. Cl.
CPC .......... *H01Q 17/005* (2013.01); *H01Q 9/0471* (2013.01); *H01Q 11/14* (2013.01); *H04B 5/0037* (2013.01); *H04B 5/0081* (2013.01); *H01Q 7/00* (2013.01)

(58) Field of Classification Search
CPC .......... H01Q 1/36; H01Q 7/00; H01Q 9/0471; H01Q 11/14; H01Q 17/005
See application file for complete search history.

(56) References Cited

U.S. PATENT DOCUMENTS

| | | | |
|---|---|---|---|
| 6,222,490 B1 | 4/2001 | Jia-Jiu et al. | |
| 7,917,226 B2 | 3/2011 | Nghiem et al. | |
| 8,766,482 B2 | 7/2014 | Cook et al. | |
| 9,672,978 B2 | 6/2017 | Fujieda | |
| 2014/0300526 A1* | 10/2014 | Rahman | H01Q 7/00 343/867 |

FOREIGN PATENT DOCUMENTS

WO 1998002936 1/1998

* cited by examiner

*Primary Examiner* — Hoang V Nguyen
(74) *Attorney, Agent, or Firm* — Hayes Soloway P.C.

(57) ABSTRACT

Disclosed is an antenna for enhancing link coupling efficiency in a power transmission. The antenna may comprise a plurality of coil windings layered across each other. It may be noted that each coil winding may be deployed with a plurality of edges. It may be understood that an edge is separated with another edge at a predetermined distance on each coil winding. It may be noted that the edge and the another edge is a subset of the plurality of edges.

4 Claims, 6 Drawing Sheets

US 10,784,585 B2

HARNESSING SHARP SHAPES IN ANTENNA STRUCTURE TO ENHANCE LINK COUPLING EFFICIENCY

CROSS-REFERENCE TO RELATED APPLICATIONS AND PRIORITY

The present application claims benefit from Indian Complete Patent Application 201711041541 filed on 20 Nov. 2017 the entirely of which is hereby incorporated by reference.

TECHNICAL FIELD

The present disclosure described herein, in general, relates to enhance link coupling efficiency of an antenna.

BACKGROUND

Wireless power transfer has been a trend in recent times due to mobile phone charging stations. However, many more applications are using or trying to use the wireless power technology without coming into the prying eyes of large consumer end market. It has also been noted that variety of applications ranging from large industry machineries to micro level body implants are trying to exploit the wireless power technology. Major bottleneck for the wireless power technology is to increase power transfer link efficiency. Many studies have been carried out to increase the power transfer link efficiency such as altering the distance between coil windings, substituting the material used in the coil windings, material of the whole system, frequency, current and voltage rating etc. However, none of the aforementioned alternation facilitates to achieve the desired power transfer link efficiency without adding complexities and cost to design of the existing antenna.

SUMMARY

Before the present antenna, is described, it is to be understood that this application is not limited to the particular antenna, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to antennas for enhancing link coupling efficiency in a power transmission and the concepts are further described below in the detailed description. This summary is not intended to identify essential features of the claimed subject matter nor is it intended for use in limiting the scope of the claimed subject matter.

In one implementation, an antenna for enhancing link coupling efficiency in a power transmission is disclosed. In one embodiment, the antenna may comprise a plurality of coil windings layered across each other. It may be noted that each coil winding may be deployed with a plurality of edges. It may be understood that an edge is separated with another edge at a predetermined distance on each coil winding. It may be noted that the 'edge' and the 'another edge' is a subset of the plurality of edges.

BRIEF DESCRIPTION OF THE DRAWINGS

The foregoing detailed description of embodiments is better understood when read in conjunction with the appended drawing. For the purpose of illustrating the disclosure, there is shown in the present document example constructions of the disclosure; however, the disclosure is not limited to the specific methods and apparatus disclosed in the document and the drawings.

Figure 1:
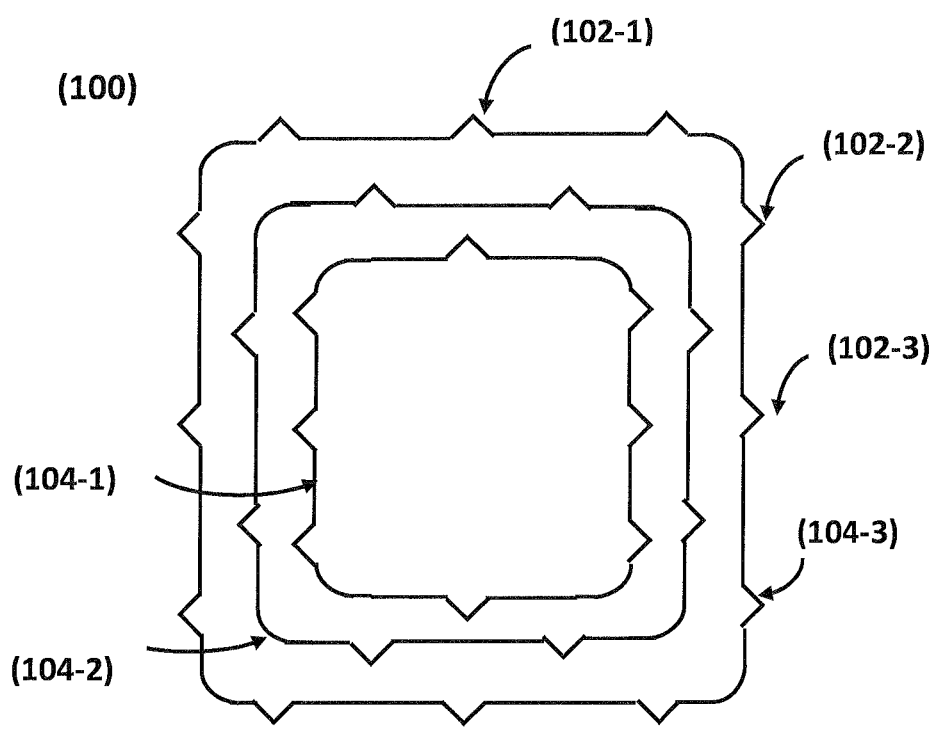
FIG. 1 illustrates a proposed antenna with sharp shapes deployed at predetermined position on the conventional antenna, in accordance with an embodiment of the present disclosure.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise. Although any apparatuses and methods similar or equivalent to those described herein can be used in the practice or testing of embodiments of the present disclosure, the exemplary, apparatuses and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present subject matter proposes a change in design of an antenna to enhance link coupling efficiency for a better wireless power transfer. The change in the design of the antenna includes sharp shapes in RF coil structure. More specifically, an optimal count of sharp shapes may be included in the antenna to facilitate Radio Frequency (RF)

signal to travel further and facilitate to increase the efficiency of the antenna. In one aspect, the sharp shapes may include at least one of an edge, a cavity, or a spike deployed on coil windings of the antenna. In one embodiment, the shape of the edge may also be created by either twisting or bending each coil winding, of the antenna, up to a predefined angle.

It may be noted that various simulations have been carried out on the proposed design of the antenna with sharp shapes and found that the link coupling efficiency may be increased in between ~2 dB to ~3 dB depending on the size and positions of the sharp shapes on the antenna. It may further be noted that the positioning of the sharp shapes plays an important role in obtaining an increase in the wireless power transfer. Thus, the link coupling efficiency is increased not obtained just by increase in the coil length but also owing to the sharp shapes and positioning of the sharp shapes at predetermined position on the antenna.

Referring now to FIG. 1, a proposed antenna 100 with sharp shapes deployed at predetermined position on the conventional antenna is disclosed. As illustrated in the figure, the proposed antenna 100 comprises a plurality of edges 102-1, 102-2 . . . 102-N, hereinafter referred to as 102, which are like spikes deployed on each layer of a plurality coil windings 104-1, 104-2, . . . , 104-N, hereinafter referred to as 104. In one aspect, each edge 102 of the antenna 100 may have a distinct shape and size or same shape and size that may depend on a type of antenna 100. Examples of the type of antenna 100 may include, but not limited to, a PCB Antenna, a Coil Antenna, and a chip antenna. It may be noted that an edge 102-1 is separated with another edge 102-2 at a predetermined distance on each coil winding 104. It may be noted that the distance between two edges may be within a range of 10 mm to 20 mm. It may be understood that the edge 102 and the another edge 102 is a subset of the plurality of edges.

Figure 2:
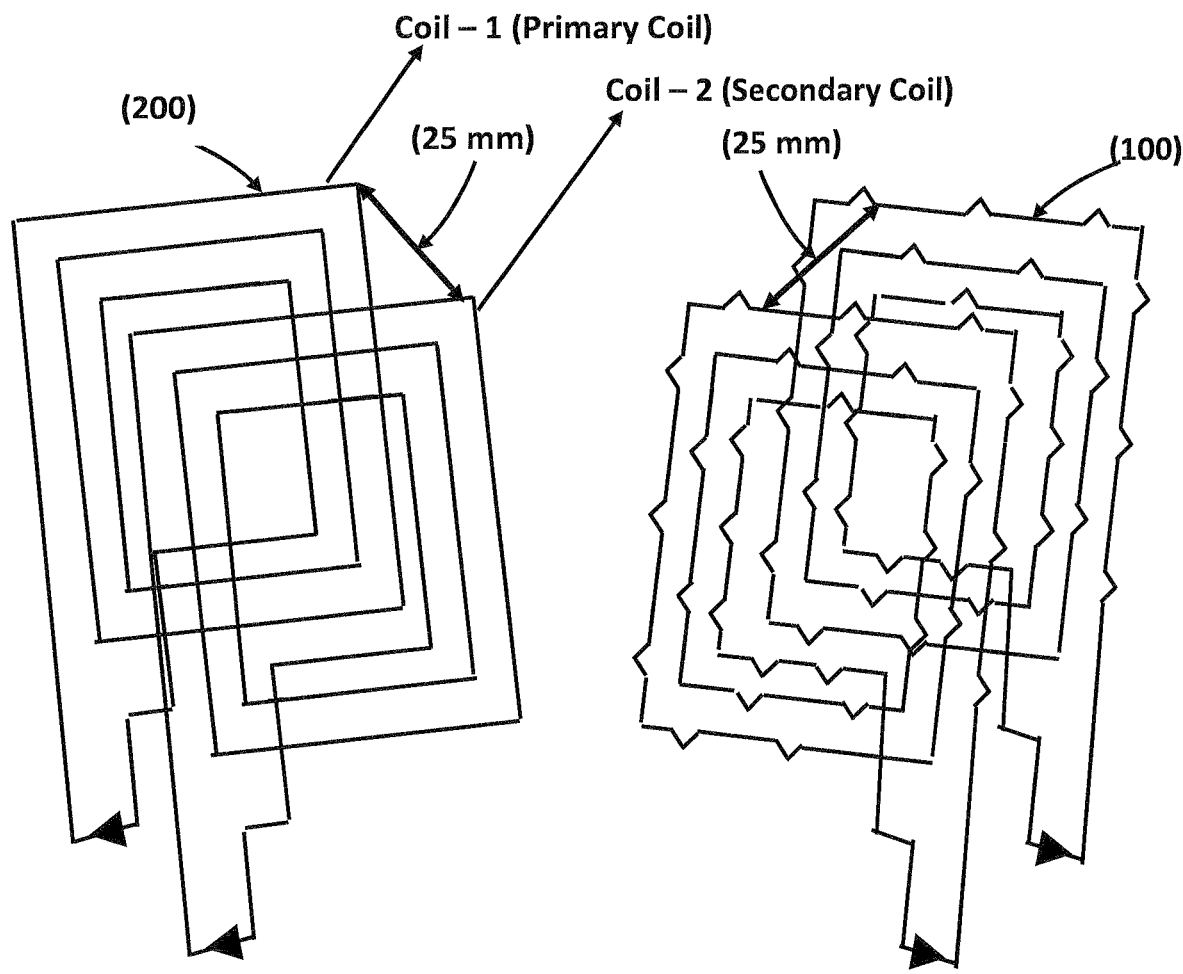
FIG. 2 illustrates a design of a conventional antenna and the proposed antenna having coils separated by 25 mm, in accordance with an embodiment of the present disclosure.

In one implementation, various simulations have been carried out with the conventional antenna 200 and the proposed antenna 100 with a distance between the two coils 104 ranging between 20 mm to 40 mm. In an exemplary embodiment of the invention, the coils (i.e. a primary, Coil 1 and a secondary coil, Coil 2) of the conventional antenna 200 and the proposed antenna 100 are separated by 25 mm space, as illustrated in FIG. 2.

A comparison of the results of the simulations taken for both the conventional antenna 200 and proposed antenna 100 is shown in a table 1 mentioned below.

| Frequency (MHz) | Conventional Antenna Coupling S21 (dB) | Proposed Antenna Coupling S21 (dB) | Link Coupling efficiency enhancement obtained |
|---|---|---|---|
| 6.78 | −14.975 | −12.837 | 2.138 |
| 12 | −15.55 | −13.228 | 2.322 |
| 13.56 | −15.994 | −13.659 | 2.335 |
| 19 | −17.732 | −15.295 | 2.437 |
| 27 | −20.077 | −17.577 | 2.5 |

As it can be inferred from the table 1 that a change in Frequency ranging between 6.78 MHz to 27 MHz helps to obtain an enhanced Link Coupling efficiency of at least ~2 dB based upon the plurality of edges deployed on each coil 104 winding of the antenna 100.

Figure 3:
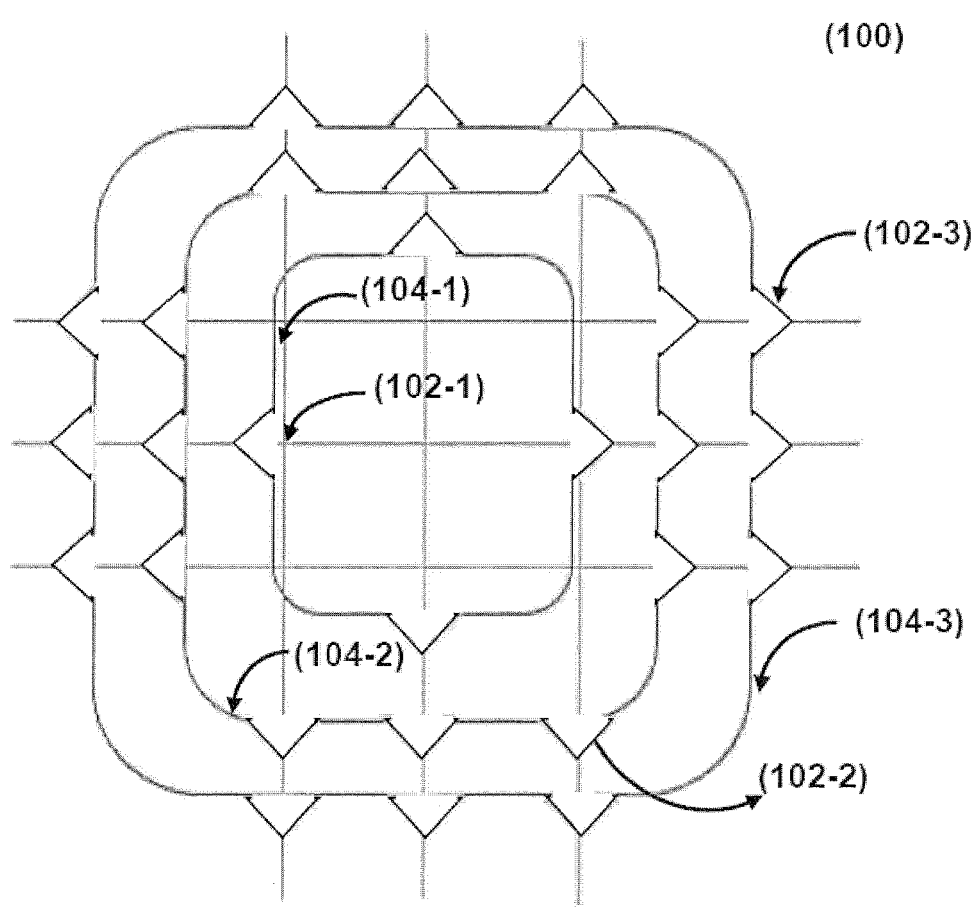
FIG. 3 illustrates a design of the antenna deployed with a plurality of edges, on each coil winding, of same shape and size, in accordance with an embodiment of the present disclosure.

Though the antenna 100 with deployed with the plurality of edges, having distinct shapes and sizes, are illustrated in FIGS. 3-6, it may be understood that the variants of the antenna 100 may not be limited to embodiments as shown in the FIGS. 3-6. In other words, any type of variation of the antenna 100 may be derived by deploying a plurality of edges on the antenna 100 provided that it is physically realizable. FIG. 3 illustrates alignment of the edges of same shape and size deployed on distinct coil windings of the antenna 100. As illustrated, the antenna 100 has three coil windings 104 i.e. Coil Winding 104-1, Coil Winding 104-2, and Coil Winding 104-3. It may be noted that, in this antenna 100, all the coil windings (104-1, 104-2, 104-3) are deployed with edges (102-1, 102-2, 102-3) of same shape and size.

Figure 4:
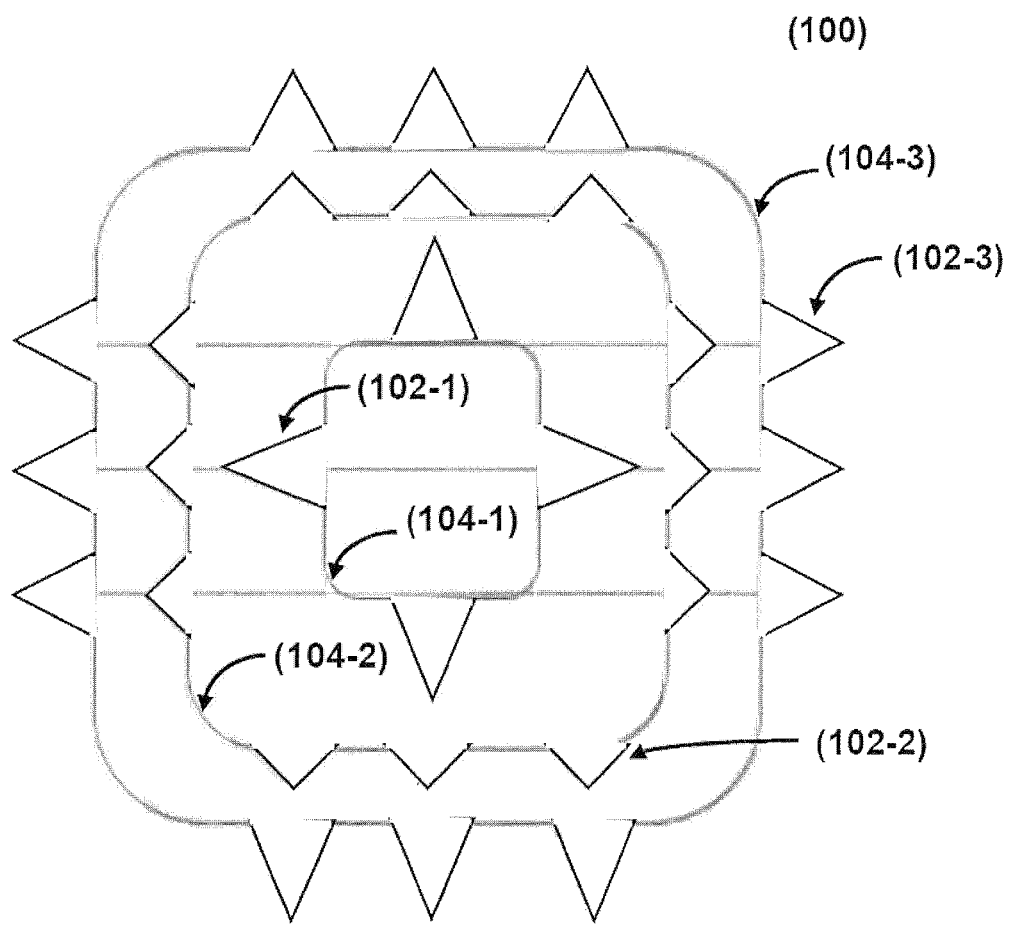
FIG. 4 illustrates a design of the antenna deployed with a plurality of edges, on each coil winding, of different shape and size, in accordance with an embodiment of the present disclosure.

Whereas, FIG. 4 illustrates alignment of the edges of different shape and size deployed on distinct coil windings of the antenna 100. As illustrated, the antenna 100 has three coil windings 104 i.e. Coil Winding 104-1, Coil Winding 104-2, and Coil Winding 104-3. It may be noted that, in this antenna 100, each coil winding (i.e. 104-1, 104-2, 104-3) is deployed with edges (102-1, 102-2, 102-3) of different shape and size.

Figure 5A:
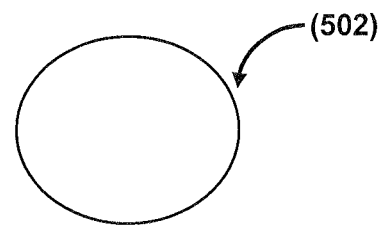
FIGS. 5A and 5B illustrate a surface of conventional circular cross section and a rectangular cross section respectively of a conductor used as an antenna, in accordance with an embodiment of the present disclosure.
Figure 5B:
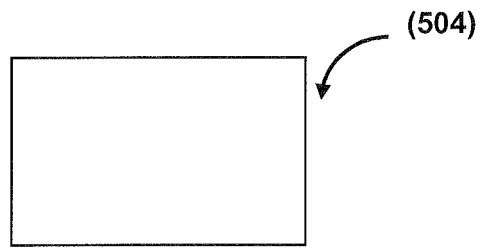
Figure 5C:
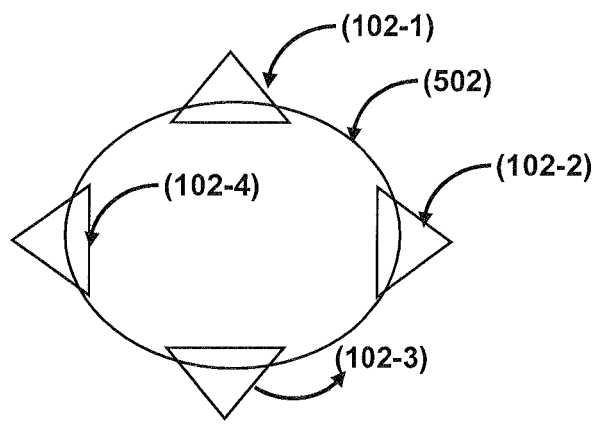
FIGS. 5C and 5D illustrate presence of the plurality of edges on the surface (circular and rectangular respectively) of the conductor, in accordance with an embodiment of the present disclosure.
Figure 5D:
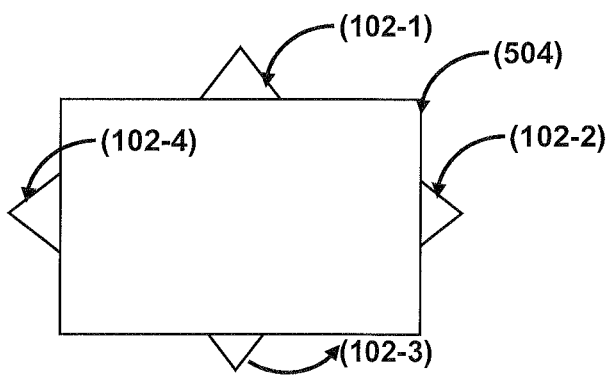

Referring to FIGS. 5A and 5B. FIG. 5A illustrates a surface of conventional circular cross section of a conductor 502 used as the antenna 100. FIG. 5B, on the other hand, illustrates typical surface of conventional rectangular/square cross section of a conductor 504 used as the antenna 100. Referring to FIGS. 5C and 5D. FIG. 5C illustrates presence of the plurality of edges (102-1, 102-2, 102-3, and 102-4) on the surface of the conductor 502 as shown in the FIG. 5A. Similarly, 5D illustrates presence of the plurality of edges (102-1, 102-2, 102-3, and 102-4) on the surface of the conductor as shown in the FIG. 5D.

Exemplary embodiments discussed above may provide certain advantages. Though not required to practice aspects of the disclosure, these advantages may include those provided by the following features.

Some embodiments enable to obtain an increase in link coupling efficiency by including sharp shapes at predetermined positions on the antenna.

Some embodiments enable to obtain the increase in the link coupling efficiency without any significant increase in size of the coil windings of the antenna.

Some embodiments enable to obtain the increase in the link coupling efficiency with no significant increase in voltage or current.

Some embodiments enable to enhance wireless power transfer and may be used for multiple systems including, but not limited to, mobile battery charging, automotive battery charging, industry instruments, and implants.

Some embodiments enable to optimize data transfer with less energy requirement and may be used for multiple systems including, but not limited to, RFID, Near Field Communication, Implants, and Industry instruments.

The invention claimed is:

1. An antenna for enhancing link coupling efficiency in a power transmission, the antenna comprising: a plurality of coil windings layered across each other, wherein each coil winding is deployed with a plurality of edges, and wherein an edge is separated with another edge at a predetermined distance on each coil winding, and wherein the edge and the another edge are each a subset of the plurality of edges, and wherein a shape of the edge is in the form of a spike, and wherein the shape of the edge is created by at least one of twisting or bending each coil winding of the plurality of coil windings, up to a predefined angle.

2. The antenna as claimed in claim 1, wherein the antenna is one of a type of antenna comprising: a micro strip (patch) antenna, a loop antenna, a PCB Antenna, a Coil Antenna, and a chip antenna.

3. The antenna as claimed in claim 1, wherein each edge of the antenna has a distinct shape and size or a same shape and size, and wherein the shape and size are determined based on a type of the antenna.

4. The antenna as claimed in claim 1, wherein a coil winding is separated with a predefined distance from another coil winding, and wherein the predefined distance is 25 mm.

* * * * *